United States Patent
Fujiya et al.

(10) Patent No.: US 12,044,778 B2
(45) Date of Patent: Jul. 23, 2024

(54) MEASUREMENT DEVICE, MEASUREMENT METHOD AND PROGRAM

(71) Applicant: PIONEER CORPORATION, Tokyo (JP)

(72) Inventors: Kazufumi Fujiya, Kawagoe (JP); Tomoaki Iwai, Kawagoe (JP); Masahiro Kato, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 712 days.

(21) Appl. No.: 16/615,087

(22) PCT Filed: May 17, 2018

(86) PCT No.: PCT/JP2018/019138
§ 371 (c)(1),
(2) Date: Nov. 19, 2019

(87) PCT Pub. No.: WO2018/212283
PCT Pub. Date: Nov. 22, 2018

(65) Prior Publication Data
US 2020/0191956 A1 Jun. 18, 2020

(30) Foreign Application Priority Data
May 19, 2017 (JP) ................ 2017-100137

(51) Int. Cl.
*G01S 17/06* (2006.01)
*G01B 21/00* (2006.01)
(Continued)

(52) U.S. Cl.
CPC .............. *G01S 17/06* (2013.01); *G01B 21/00* (2013.01); *G01C 21/005* (2013.01); *G01C 21/28* (2013.01); *G01S 17/89* (2013.01); *G01S 17/931* (2020.01)

(58) Field of Classification Search
CPC ........ G01S 17/06; G01S 17/89; G01S 17/931; G01B 21/00; G01C 21/005; G01C 21/28
See application file for complete search history.

(56) References Cited

U.S. PATENT DOCUMENTS 8,755,967 B1 * 6/2014 Ferguson ................. G05D 1/00
382/104
8,948,958 B1 2/2015 Ferguson et al.
(Continued)

FOREIGN PATENT DOCUMENTS

JP 2010023721 A 2/2010
JP 5028662 B2 9/2012
(Continued)

OTHER PUBLICATIONS

Pythagorean Theorem Calculator (Year: 2008).*
(Continued)

*Primary Examiner* — Mohamed Charioui
*Assistant Examiner* — Dacthang P Ngo
(74) *Attorney, Agent, or Firm* — PROCOPIO, CORY, HARGREAVES & SAVITCH LLP (57) ABSTRACT

The measurement device acquires output data from a sensor unit for detecting road surface lines around, and determines a predetermined range based on an own position and positional information of broken-line type road surface lines. Then, the measurement device extract, from the output data, data corresponding to detection result of the predetermined range, and executes predetermined processing based on the extracted data.

10 Claims, 8 Drawing Sheets

(51) Int. Cl.
  *G01C 21/00* (2006.01)
  *G01C 21/28* (2006.01)
  *G01S 17/89* (2020.01)
  *G01S 17/931* (2020.01)

(56) References Cited

U.S. PATENT DOCUMENTS

| | | | | |
|---|---|---|---|---|
| 2015/0260530 | A1* | 9/2015 | Stenborg | G01C 21/28 701/461 |
| 2017/0336515 | A1* | 11/2017 | Hosoya | G01S 19/40 |
| 2018/0045516 | A1* | 2/2018 | Sumizawa | G01C 21/28 |
| 2018/0172455 | A1 | 6/2018 | Yamaguchi et al. | |
| 2018/0347990 | A1* | 12/2018 | Mishina | G01S 19/49 |
| 2021/0342603 | A1* | 11/2021 | Hori | B60W 40/06 |

FOREIGN PATENT DOCUMENTS

| | | |
|---|---|---|
| JP | 2015114126 A | 6/2015 |
| JP | 2015206733 A | 11/2015 |
| JP | 2015222223 A | 12/2015 |
| JP | 2017004176 A | 1/2017 |
| JP | 2017-078607 | 4/2017 |
| JP | 2017072422 A | 4/2017 |
| WO | 2015087502 A1 | 6/2015 |
| WO | 2016189732 A1 | 12/2016 |

OTHER PUBLICATIONS

Extended European Search Report dated Feb. 2, 2021 in counterpart EP Patent Application No. 18802797.3, 9 pages.
International Search Report for related International Application No. PCT/JP2018/019138, mailed on Aug. 21, 2018; English translation provided (4 pages).

* cited by examiner

FIG. 1

$X_m, Y_m$ : MAP COORDINATE SYSTEM
$X_v, Y_v$ : VEHICLE COORDINATE SYSTEM
WLMP $(mx_m, my_m)$ : WHITE LINE MAP POSITION IN MAP COORDINATE SYSTEM
WLPP $(l'x_v, l'y_v)$ : WHITE LINE PREDICTED POSITION IN VEHICLE COORDINATE SYSTEM
PVP $(x'_m, y'_m)$ : PREDICTED OWN VEHICLE POSITION IN MAP COORDINATE SYSTEM
$\psi'_m$ : PREDICTED OWN VEHICLE AZIMUTH ANGLE IN MAP COORDINATE SYSTEM
WLCP $(sx_v, sy_v)$ : WHITE LINE CENTER POSITION IN VEHICLE COORDINATE SYSTEM

ND PROGRAM

CROSS-REFERENCE TO RELATED APPLICATIONS

This application is a U.S. National Stage entry of PCT Application No: PCT/JP2018/019138 filed May 17, 2018, which claims priority to Japanese Patent Application No. 2017-100137, filed May 19, 2017, the contents of which are incorporated herein by reference.

TECHNICAL FIELD

The present invention relates to a technique of estimating a position of a movable body based on positions of features.

BACKGROUND TECHNIQUE

In an automatic driving vehicle, it is necessary to match feature positions measured by a sensor such as a LiDAR (Light Detection and Ranging) and feature positions in map information for automatic driving to precisely estimate an own vehicle position. Examples of the features used here include white lines, road signs and signboards. Patent Reference 1 discloses an example of a method of estimating an own vehicle position by using the feature positions detected by a LiDAR and the feature positions in map information. Patent Reference 2 discloses a technique of transmitting an electromagnetic wave to a road surface and detecting white lines based on its reflectivity.

PRIOR ART REFERENCES

Patent References

Patent Reference 1: Japanese Patent Application Laid-Open under No. 2017-72422
Patent Reference 2: Japanese Patent Application Laid-Open under No. 2015-222223

SUMMARY OF THE INVENTION

Problem to be Solved by the Invention

When an own vehicle position is estimated using white lines, an amount of data measured by a LiDAR becomes different dependently upon kinds (e.g., continuous line or broken line) of the white lines and deterioration of painting. Therefore, when an own vehicle position is estimated using white lines, detection accuracy of the white lines is changed between the cases in which the amount of LiDAR data used for detecting the while lines is small and large. As a result, accuracy of estimating an own vehicle position is changed.

The above is an example of the problem to be solved by the present invention. It is an object of the present invention to appropriately adjust a range in which white lines are detected according to situation, and to prevent deterioration of accuracy in estimating an own vehicle position.

Means for Solving the Problem

An invention described in claims is a measurement device comprising: an acquisition unit configured to acquire output data from a sensor unit for detecting road surface lines around; a determination unit configured to determine a predetermined range based on an own position and positional information of broken-line type road surface lines; an extraction unit configured to extract, from the output data, data corresponding to detection result of the predetermined range; and a processing unit configured to execute predetermined processing based on the extracted data.

Another invention described in claims is a measurement device comprising: an acquisition unit configured to acquire output data from a sensor unit for detecting road surface lines around; a determination unit configured to determine a predetermined range based on an own position, curvature of the road surface lines and positional information of broken-line type road surface lines; an extraction unit configured to extract, from the output data, data corresponding to detection result of the predetermined range; and a processing unit configured to execute predetermined processing based on the extracted data.

Still another invention described in claims is a measurement method executed by a measurement device comprising: an acquisition process configured to acquire output data from a sensor unit for detecting road surface lines around; a determination process configured to determine a predetermined range based on an own position and positional information of broken-line type road surface lines; an extraction process configured to extract, from the output data, data corresponding to detection result of the predetermined range; and a processing process configured to execute predetermined processing based on the extracted data.

Still another invention described in claims is a measurement method executed by a measurement device comprising: an acquisition process configured to acquire output data from a sensor unit for detecting road surface lines around; a determination process configured to determine a predetermined range based on an own position, curvature of the road surface line and positional information of broken-line type road surface lines; an extraction process configured to extract, from the output data, data corresponding to detection result of the predetermined range; and a processing process configured to execute predetermined processing based on the extracted data.

Still another invention described in claims is a program executed by a measurement device including a computer, the program causing the computer to function as: an acquisition unit configured to acquire output data from a sensor unit for detecting road surface lines around; a determination unit configured to determine a predetermined range based on an own position and positional information of broken-line type road surface lines; an extraction unit configured to extract, from the output data, data corresponding to detection result of the predetermined range; and a processing unit configured to execute predetermined processing based on the extracted data.

Still another invention described in claims is a program executed by a measurement device including a computer, the program causing the computer to function as: an acquisition unit configured to acquire output data from a sensor unit for detecting road surface lines around; a determination unit configured to determine a predetermined range based on an own position, curvature of the road surface line and positional information of broken-line type road surface lines; an extraction unit configured to extract, from the output data, data corresponding to detection result of the predetermined range; and a processing unit configured to execute predetermined processing based on the extracted data.

DETAILED DESCRIPTION OF THE PREFERRED EMBODIMENTS

According to one aspect of the present invention, there is provided a measurement device comprising: an acquisition unit configured to acquire output data from a sensor unit for detecting road surface lines around; a determination unit configured to determine a predetermined range based on an own position and positional information of broken-line type road surface lines; an extraction unit configured to extract, from the output data, data corresponding to detection result of the predetermined range; and a processing unit configured to execute predetermined processing based on the extracted data.

The above measurement device acquires output data from a sensor unit for detecting road surface lines around, and determines a predetermined range based on an own position and positional information of broken-line type road surface lines. Then, the measurement device extracts, from the output data, data corresponding to detection result of the predetermined range, and executes predetermined processing based on the extracted data. By this measurement device, the predetermined range may be appropriately determined for the broken-line type road surface lines. In this specification, "road surface lines" include lane dividing lines such as white and yellow lines, and linear road signs such as stop lines and pedestrian crossings.

In one mode of the above measurement device, the determination unit determines the predetermined rang based on the own position and the positional information of solid line sections of the broken-line type road surface lines. In this mode, the predetermined range can be appropriately determined by using the positional information of the solid line sections of the broken-line type road surface lines.

In another mode of the above measurement device, the determination unit detects edges of the solid line sections, and determines the predetermined range based on the edges. In this mode, the predetermined range is determined based on the edges of the solid line sections. Preferably, the determination unit detects the edges based on a difference of the positional information of plural points forming the solid line sections.

According to another aspect of the present invention, there is provided a measurement device comprising: an acquisition unit configured to acquire output data from a sensor unit for detecting road surface lines around; a determination unit configured to determine a predetermined range based on an own position, curvature of the road surface lines and positional information of broken-line type road surface lines; an extraction unit configured to extract, from the output data, data corresponding to detection result of the predetermined range; and a processing unit configured to execute predetermined processing based on the extracted data.

The above measurement device acquires output data from a sensor unit for detecting road surface lines around, and determines a predetermined range based on an own position, curvature of the road surface lines and positional information of broken-line type road surface lines. Then, the measurement device extracts, from the output data, data corresponding to detection result of the predetermined range, and executes predetermined processing based on the extracted data. By this measurement device, even if the road surface line is curved, the predetermined range can be appropriately determined in consideration of its curvature.

In one mode, the measurement device is loaded on a movable body, and the determination unit sets the predetermined ranges at four positions including a right-front position, a right-rear position, a left-front position and a left-rear position with respect to a position of the movable body. In this mode, data is extracted at four positions around the movable body, and predetermined processing is executed based on those data. Preferably, the processing unit executes the processing of detecting positions of the road surface lines and estimating a position of the measurement device based on the positions of the road surface lines.

According to still another aspect of the present invention, there is provided a measurement method executed by a measurement device comprising: an acquisition process configured to acquire output data from a sensor unit for detecting road surface lines around; a determination process configured to determine a predetermined range based on an own position and positional information of broken-line type road surface lines; an extraction process configured to extract, from the output data, data corresponding to detection result of the predetermined range; and a processing process configured to execute predetermined processing based on the extracted data. By this method, the predetermined range can be appropriately determined for the broken-line type road surface lines.

According to still another aspect of the present invention, there is provided a measurement method executed by a measurement device comprising: an acquisition process configured to acquire output data from a sensor unit for detecting road surface lines around; a determination process configured to determine a predetermined range based on an own position, curvature of the road surface line and positional information of broken-line type road surface lines; an extraction process configured to extract, from the output data, data corresponding to detection result of the predetermined range; and a processing process configured to execute predetermined processing based on the extracted data. By this measurement method, even if the road surface line is curved, the predetermined range can be appropriately determined in consideration of its curvature.

According to still another aspect of the present invention, there is provided a program executed by a measurement device including a computer, the program causing the computer to function as: an acquisition unit configured to acquire output data from a sensor unit for detecting road surface lines around; a determination unit configured to determine a predetermined range based on an own position and positional information of broken-line type road surface lines; an extraction unit configured to extract, from the output data, data corresponding to detection result of the predetermined range; and a processing unit configured to execute predetermined processing based on the extracted data. By executing the program by a computer, the above measurement device may be realized.

According to still another aspect of the present invention, there is provided a program executed by a measurement device including a computer, the program causing the computer to function as: an acquisition unit configured to acquire output data from a sensor unit for detecting road surface lines around; a determination unit configured to determine a predetermined range based on an own position, curvature of the road surface line and positional information of broken-line type road surface lines; an extraction unit configured to extract, from the output data, data corresponding to detection result of the predetermined range; and a processing unit configured to execute predetermined processing based on the extracted data. By executing the program by a computer, the above measurement device may be realized. This program may be handled in a manner stored in a storage medium.

Embodiments

A preferred embodiment of the present invention will be described below with reference to the attached drawings.

[White Line Extraction Method]

Figure 1:
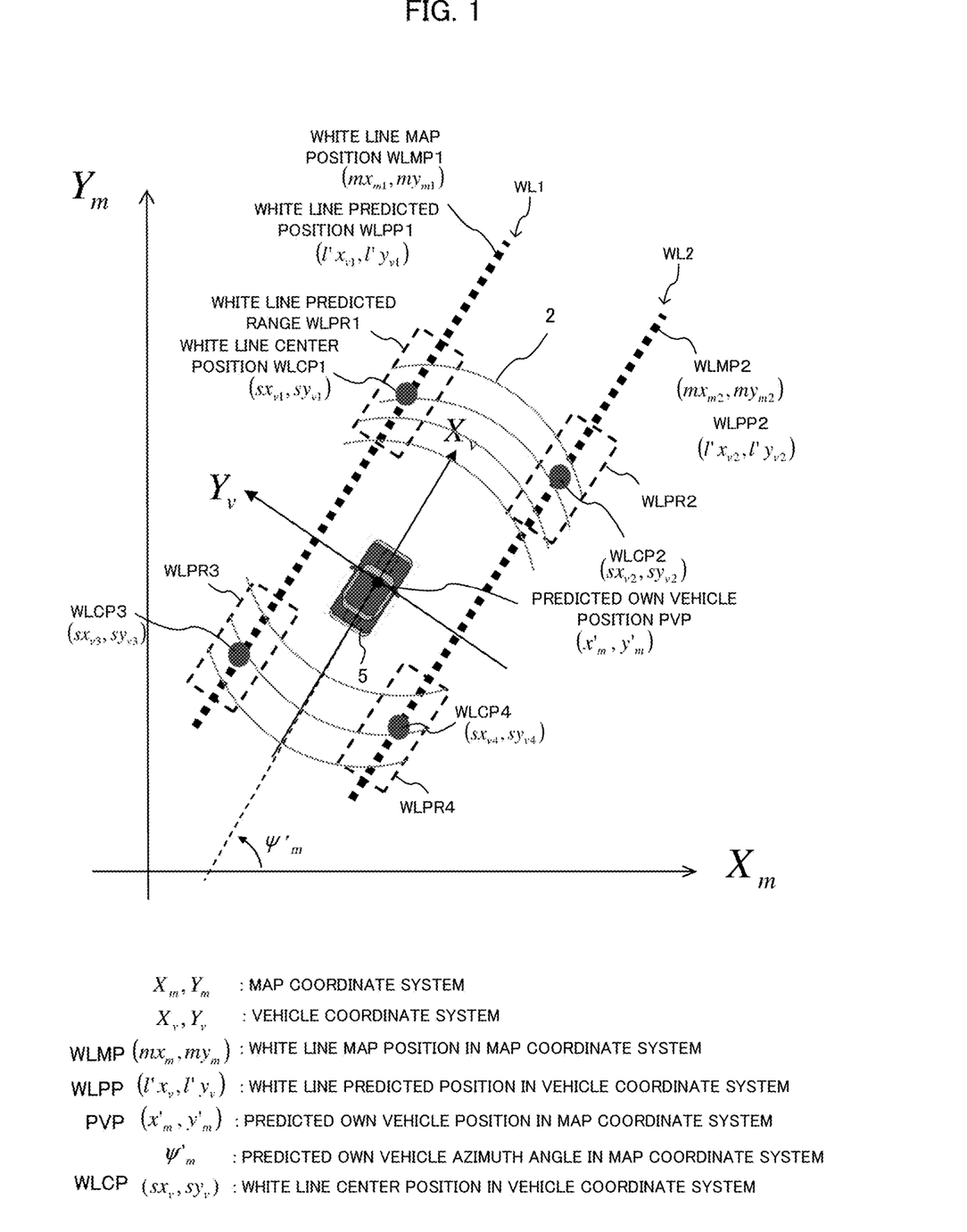
FIG. 1 is a diagram explaining a white line extraction method.

FIG. 1 is a diagram explaining a white line extraction method. "White line extraction" is to detect a white line painted on a road surface and calculate its predetermined position, e.g., a center position.

(Calculation of White Line Predicted Position)

As illustrated, a vehicle 5 exists on a map coordinate system ($X_m$, $Y_m$), and a vehicle coordinate system ($X_v$, $Y_v$) is defined based on the position of the vehicle 5. Specifically, the traveling direction of the vehicle 5 is defined as $X_v$-axis of the vehicle coordinate system, and its perpendicular direction is defined as $Y_v$-axis of the vehicle coordinate system.

On the left and right sides of the vehicle 5, there are white lines serving as lane boundaries. The positions of the white lines on the map coordinate system, i.e., the white line map positions are included in high-density map managed by a server, and are acquired from the server. In this embodiment, the data of the white line is stored in the high-density map as coordinate point sequence. The LiDAR loaded on the vehicle 5 measures scan data along the scan lines 2. The scan lines 2 indicate loci of the scan by the LiDAR.

In FIG. 1, it is supposed that the coordinates of the points forming the white line WL1 on the left side of the vehicle 5, i.e., the white line map positions WLMP1 are ($mx_{m1}$, $my_{m1}$), and that the coordinates of the points forming the white line WL2 on the right side of the vehicle 5, i.e., the white line map positions WLMP2 are ($mx_{m2}$, $my_{m2}$). The predicted own vehicle position PVP on the map coordinate system is given as ($x'_m$, $y'_m$), and the predicted own vehicle azimuth angle is given as $\Psi'_m$.

Here, the white line predicted positions WLPP ($l'x_v$, $l'y_v$) indicating predicted positions of the white lines are given by the following equation (1) using the white line map position WLMP ($mx_m$, $my_m$), the predicted own vehicle position PVP ($x'_m$, $y'_m$) and the predicted own vehicle azimuth angle $\Psi'_m$.

$$\begin{bmatrix} l'x_v \\ l'y_v \end{bmatrix} = \begin{bmatrix} \cos\psi'_m & \sin\psi'_m \\ -\sin\psi'_m & \cos\psi'_m \end{bmatrix} \begin{bmatrix} mx_m - x'_m \\ my_m - y'_m \end{bmatrix} \quad (1)$$

Therefore, by the equation (1), the white line predicted positions WLPP1 ($l'x_{v1}$, $l'y_{v1}$) are calculated for the white line WL1, and the white line predicted positions WLPP2 ($l'x_{v2}$, $l'y_{v2}$) are calculated for the white line WL2. Thus, for each of the white lines WL1 and WL2, plural white line predicted positions WLPP1 and WLPP2 are obtained.

(Determination of White Line Predicted Range)

Next, based on the white line predicted positions WLPP, white line predicted ranges WLPR are determined. The white line predicted range WLPR indicates a range in which the white line is supposed to exist, based on the predicted own vehicle position PVP. The white line predicted ranges WLPR are set at four positions at most, i.e., at the right-front position, the right-rear position, the left-front position and the left-rear position of the vehicle 5.

Figure 2A:
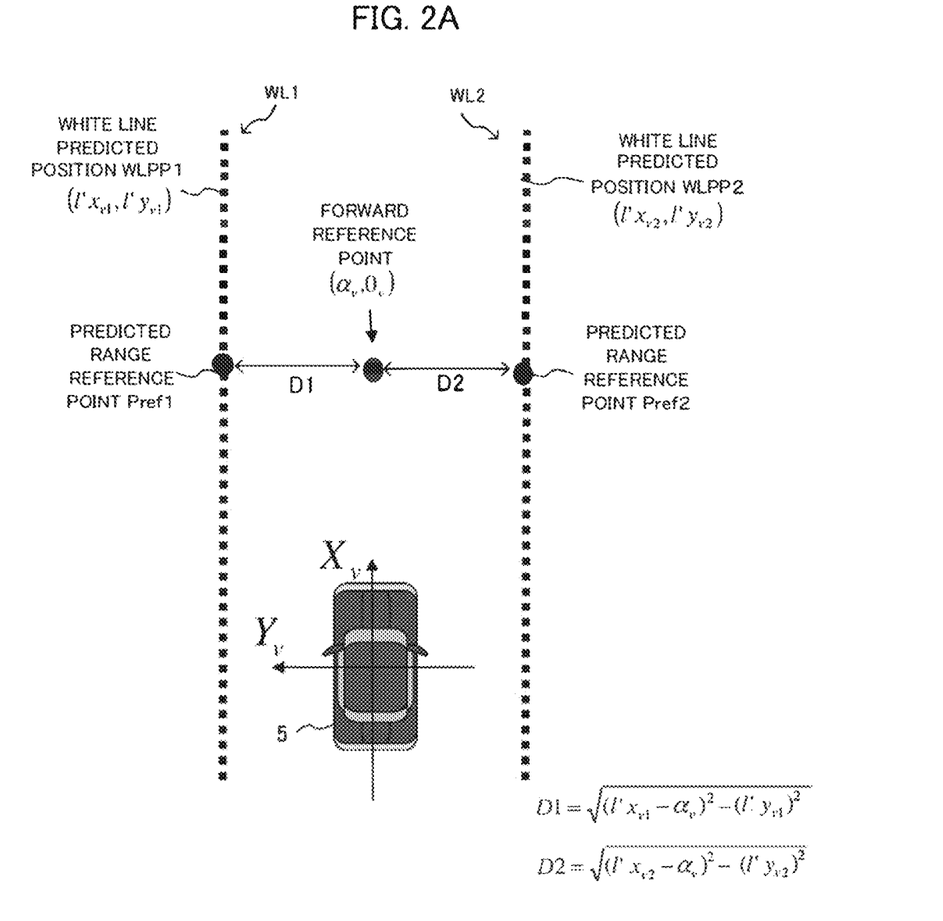
FIGS. 2A and 2B are diagrams explaining a determination method of white line predicted range.

FIGS. 2A and 2B illustrate a determination method of the white line predicted range WLPR. In FIG. 2A, a forward reference point ($\alpha_v$, $0_v$) is set at an arbitrary position (at the position of the distance $\alpha_v$ ahead of the vehicle 5. Then, based on the forward reference point ($\alpha_v$, $0_v$) and the white line predicted positions WLPP, the white line predicted position WLPP nearest from the forward reference point ($\alpha_v$, $0_v$) is searched. Specifically, as to the white line WL1, a distance D1 is calculated by the following equation (2) based on the forward reference point ($\alpha_v$, $0_v$) and plural white line predicted positions WLPP1 ($l'x_{v1}$, $l'y_{v1}$) forming the white line WL1, and the white line predicted position WLPP1 having the minimum distance D1 is determined as a predicted range reference point Pref1.

$$D1 = \sqrt{(l'x_{v1}-\alpha_v)^2 - (l'y_{v1})^2} \quad (2)$$

Similarly, as to the white line WL2, a distance D2 is calculated by the following equation (3) based on the forward reference point ($\alpha_v$, $0_v$) and plural white line predicted positions WLPP2 ($l'x_{v2}$, $l'y_{v2}$) forming the white line WL2, and the white line predicted position WLPP2 having the minimum distance D2 is determined as a predicted range reference point Pref2.

$$D2 = \sqrt{(l'x_{v2}-\alpha_v)^2 - (l'y_{v2})^2} \quad (3)$$

Figure 2B:
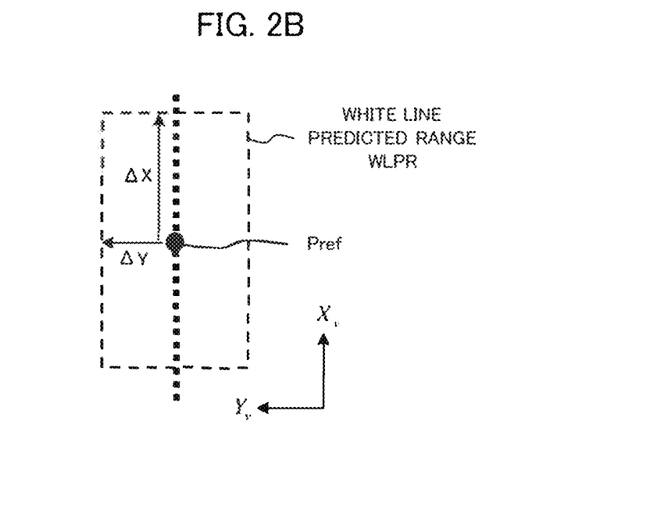

Then, as illustrated in FIG. 2B, an arbitrary range based on the predicted range reference point Pref, i.e., a range of $\pm\Delta X$ in the $X_v$-axis direction and $\pm\Delta Y$ in the $Y_v$-axis direction from the predicted range reference point Pref is set as the white line predicted range WLPR. Thus, as illustrated in FIG. 1, the white line predicted ranges WLPR1 and WLPR2 are set at the left and right positions ahead of the vehicle 5. Similarly, by setting a rear reference point behind the vehicle 5 to set the predicted range reference points Pref, the white line predicted ranges WLPR3 and WLPR4 are set at the left and right positions behind the vehicle 5. Thus, four white line predicted ranges WLPR1 to WLPR4 are set.

[Calculation of White Line Center Position]

Figure 3A:
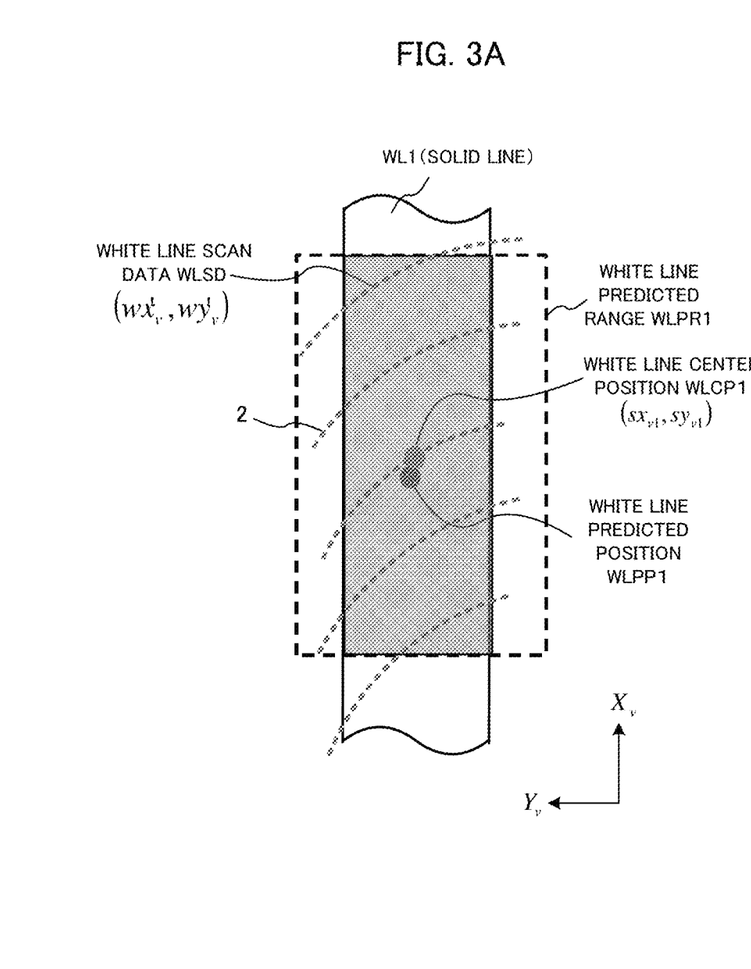
FIGS. 3A and 3B are diagrams explaining a calculation method of white line center position.
Figure 3B:
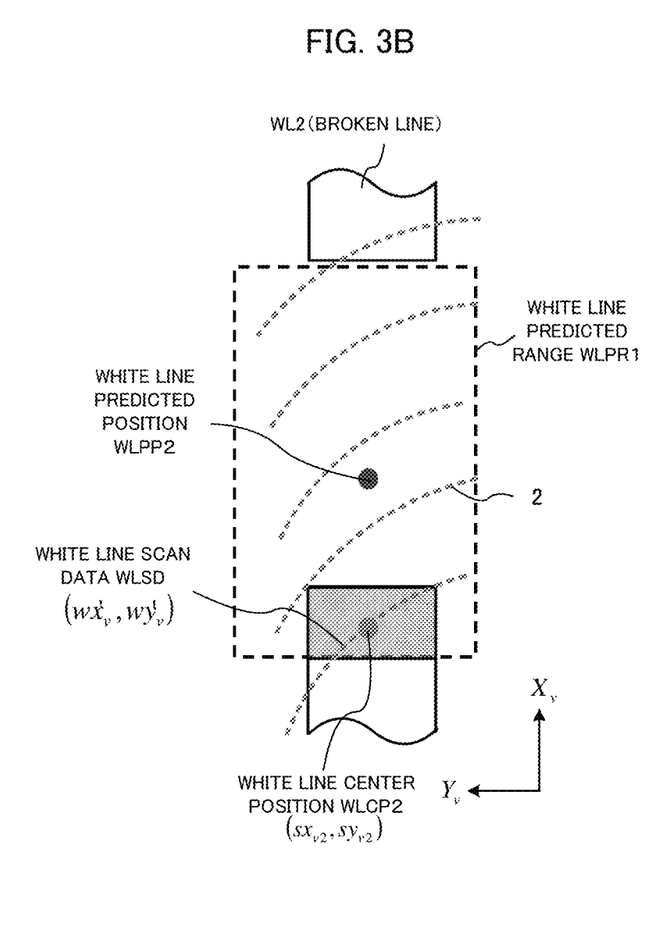

Next, a white line center position WLCP is calculated using the white line predicted positions WLPP. FIGS. 3A and 3B illustrate a calculation method of the white line center position WLCP. FIG. 3A illustrates the case where the white line WL1 is a solid line. The white line center position WLCP1 is calculated by an average value of the position coordinates of the scan data forming the white line. When the white line predicted range WLPR1 is set as shown in FIG. 3A, white line scan data WLSD1 ($wx'_v$, $wy'_v$) existing in the white line predicted range WLPR1 are extracted from the scan data outputted by the LiDAR. Since the reflectivity is higher on the white line than on a normal road, the scan data acquired on the white line have high reflectivity. Out of the scan data outputted by the LiDAR, the scan data existing in the white line predicted range WLPR1, existing on the road and having a reflection intensity higher than a predetermined value are extracted as the white line scan data WLSD. Supposing that the number of the extracted white line scan data WLSD is "n", the coordinates of the white line center position WLCP1 ($sx_{v1}$, $sy_{v1}$) is calculated by the following equation (4).

$$sx_v = \frac{1}{n}\sum_{k=1}^{n} wx_{vn} \qquad (4)$$

$$sy_v = \frac{1}{n}\sum_{k=1}^{n} wy_{vn}$$

n: number of white line scan data

Also, as shown in FIG. 3B, the white line center position WLCP2 is calculated in the same manner when the white line is a broken line.

(Determination of White Line Predicted Range in a Special Case)

Next, description will be given of methods of determining the white line predicted ranges WLPR in a special case.

(1) In Case that the White Line is a Broken Line

As described above, the white line predicted ranges WLPR are determined based on the white line predicted positions WLPP. However, when the white line is a broken line (this kind of white line will be hereinafter referred to as "broken-line type white line), there may occur such a situation that the white line WL is not included in the white line predicted range WLPR.

Figure 4A:
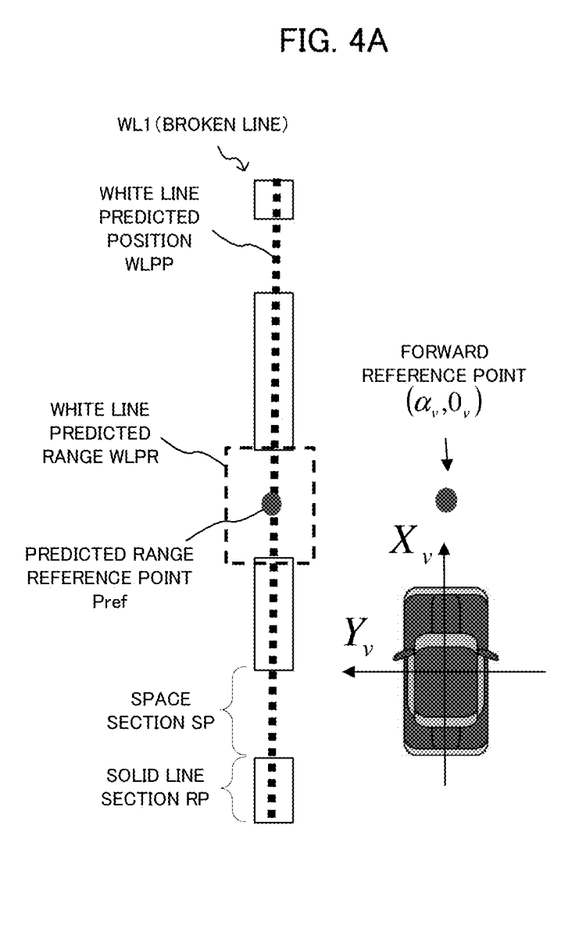
FIGS. 4A and 4B are diagrams explaining a determination method of a white line predicted range of for a broken-line type white line.
Figure 4B:
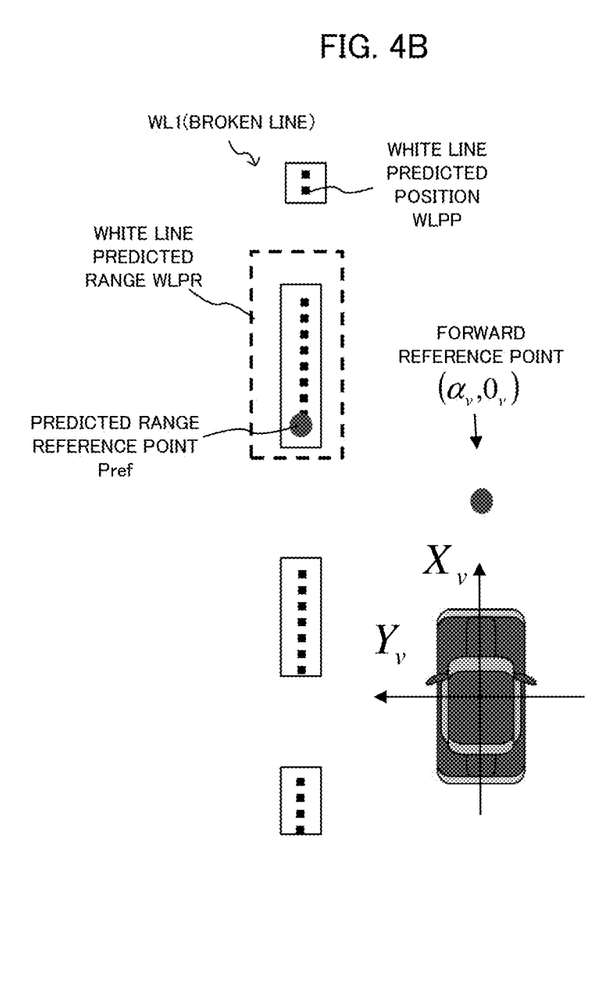

FIGS. 4A and 4B illustrate examples of white line predicted ranges WLPR in case of the broken-line type white line. The broken-line type white line WL includes the solid line sections RP and the space sections SP arranged alternately. The solid line section RP is a part where the white line is painted, and the space section SP existing between the solid line sections RP is a part where the white line is not painted. Now, when the forward reference point is defined as shown in FIG. 4A and the white line predicted range WLPR is determined, the position of the white line predicted range WLPR corresponds to the space section SP of the broken-line type white line white line, and the white line predicted range WLPR hardly includes the solid line section RP of the broken-line type white line. In such a case, since sufficient number of white line scan data WLSD cannot be acquired from the white line predicted range WLPR, it is not possible to accurately calculate the white line center position WLCP.

As a countermeasure to this case, in this embodiment, information related to the broken line is included in the white line map information stored in the high-density map, and the white line predicted range WLPR is determined based on the white line position information of the solid line section of the broken-line type white line. Specifically, the white line map positions WLMP included in the white line map information of the broken-line type white line stored in the high-density map are limited only to the plural white line map positions WLMP forming the solid line sections RP. Namely, the white line map information of the broken-line type white line includes plural white line map positions WLMP corresponding to the solid line sections RP, but does not include the white line map positions WLMP corresponding to the space sections SP. Thus, by the above-mentioned determination method of the white line predicted range using the plural white line map positions WLMP corresponding to the solid line sections RP, the white line predicted range WLPR may be determined to include the solid line sections RP of the broken-line type white lines.

FIG. 4B illustrates a method of determining the white line predicted positions WLPR by this method. First, from the white line map information of the broken-line type white lines, the white line map positions WLMP corresponding to the solid line sections RP are acquired. Next, by using the white line map positions WLMP corresponding to the solid line sections RP, by the aforementioned equation (1), the white line predicted positions WLPP are calculated. Then, by the method described with reference to FIGS. 2A and 2B, by using the white line predicted positions WLMP corresponding to the solid line sections RP, the white line predicted range WLPR is determined. Specifically, the white line predicted position WLPP nearest from the forward reference point is determined as the predicted range reference point Pref, and a predetermined range from the predicted range reference position Pref is determined as the white line predicted range WLPR.

This method does not use the white line map positions corresponding to the space sections SP of the broken-line type white lines, and uses only the white line map positions WLMP corresponding to the solid line sections RP. Therefore, it is possible to determine the white line predicted ranges WLPR which correctly include the solid line sections RP.

However, by this method, the predicted range reference point Pref acquired at the time of determining the white line predicted range WLPR becomes the edge, i.e., the upper edge or the lower edge, of the solid line section RP of the broken-line type white lines. Therefore, it is necessary to determine whether the acquired predicted range reference point Pref is at the upper edge or the lower edge of the solid line section RP, and determine the white line predicted range WLPR in accordance with the result.

Figure 5A:
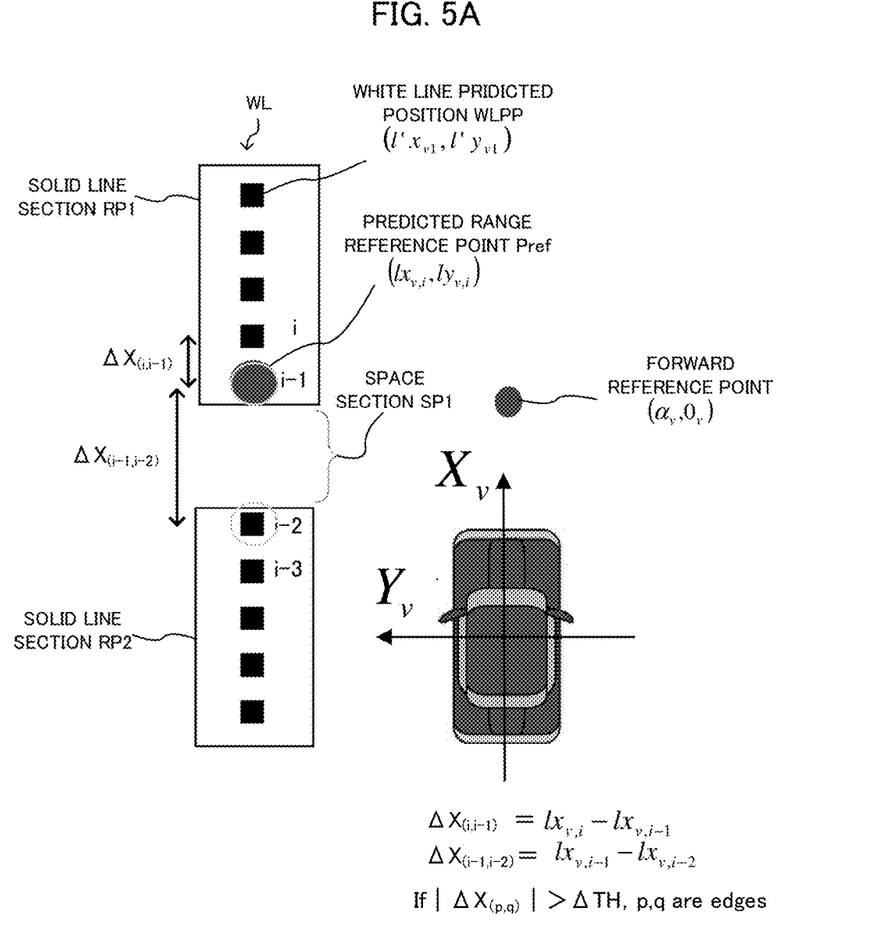
FIGS. 5A to 5C are diagrams explaining a search method of edges of solid line sections.
Figure 5B:
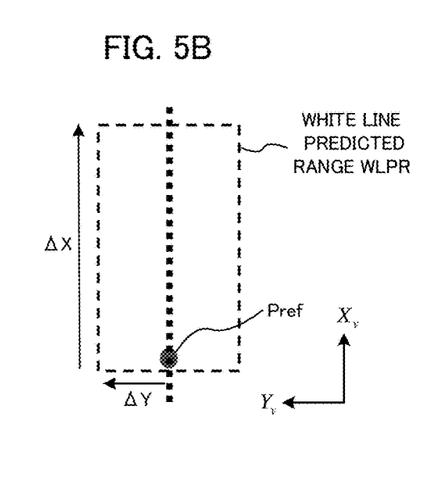
Figure 5C:
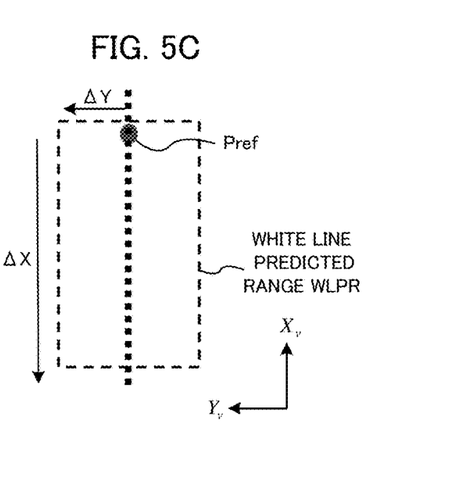

FIGS. 5A to 5C illustrates a method of determining whether the predicted range reference point Pref is at the upper edge or the lower edge of the solid line section RP. To the white line map positions WLMP stored in the high-density map, IDs are assigned as identification information. Also, to the white line predicted positions WLPP calculated based on the white line map positions WLMP, the same ID as the white line map position WLMP serving as its base is assigned. In the example of FIG. 5A, the IDs increase from the lower side to the upper side.

Here, as is understood from FIG. 5A, there is an interval corresponding to the space section SP between the white line predicted position WLPP at the lower edge of a certain solid line section RP1 and the white line predicted position WLPP at the upper edge of the solid line section RP2 neighboring the solid line section RP1. In the example of FIG. 5A, there is an interval corresponding to the space section SP between the white line predicted position WLPP of ID=(i−1) and the white line predicted position WLPP of ID=(i−2). Therefore, the interval ΔX of two neighboring white line predicted positions WLPP in the $X_v$-axis direction is calculated. In this case, the interval $\Delta X_{(p,q)}$ is calculated by subtracting the white line predicted position (ID=q) at the lower side (negative side of the $X_v$-axis direction) from the white line predicted position (ID=p) at the upper side (positive side of the $X_v$-axis direction). Then, when the absolute value $|\Delta X_{(p,q)}|$ of the interval $\Delta X_{(p,q)}$ is larger than a predetermined threshold value ΔTH corresponding to the space section SP, it is determined that there is a space section SP between those two white line predicted positions WLPP and those two white line predicted positions WLPP are the lower edge and the upper edge of different solid line sections RP.

Specifically, in the example of FIG. 5A, the interval $\Delta X_{(i,i-1)}$ between the white line predicted position WLPP of ID=i and the white line predicted position WLPP of ID=(i−1) in the Xv-axis direction is calculated by the following equation (5).

$$\Delta X_{(i,i-1)} = lx_{v,i} - lx_{v,i-1} \quad (5)$$

The absolute value $|\Delta X_{(i,i-1)}|$ is compared with the predetermined threshold $\Delta TH$ corresponding to the length of the space section SP. As is understood from FIG. 5A, since $|\Delta X_{(i,i-1)}|$ is not longer than the threshold $\Delta TH$, it is recognized that there is no space section SP between the white line predicted position WLPP of ID=i and the white line predicted position WLPP of ID=(i−1).

Similarly, the interval $\Delta X_{(i-1,i-2)}$ between the white line predicted position WLPP of ID=(i-1) and the white line predicted position WLPP of ID=(i−2) in the Xv-axis direction is calculated by the following equation (6).

$$\Delta X_{(i-1,i-2)} = lx_{v,i-1} - lx_{v,i-2} \quad (6)$$

The absolute value $|\Delta X_{(i-1,i-2)}|$ is compared with the predetermined threshold $\Delta TH$. As is understood from FIG. 5A, since $|\Delta X_{(i-1,i-2)}|$ is longer than the threshold $\Delta TH$, it is recognized that there is a space section SP between the white line predicted position WLPP of ID=(i−1) and the white line predicted position WLPP of ID=(i−2). Namely, it is recognized that both the white line predicted position WLPP of ID=(i−1) and the white line predicted position WLPP of ID=(i−2) are the edges of the sold line section RP.

Here, which is the upper edge and which is the lower edge can be determined by the manner of assigning the IDs to the white line map positions. When the IDs are assigned from the lower side to the upper side, i.e., in an increasing manner from the negative side to the positive side of the $X_v$-axis as shown in FIG. 5A, the value of $\Delta X_{(p,q)}$ becomes positive. Therefore, if $\Delta X_{(p,q)} > 0$, the IDs are assigned from the negative side to the positive side of the $X_v$-axis. Then, it is possible to determine that the white line predicted position WLPP having the larger ID is at the lower edge of one solid line section RP, and the white line predicted position WLPP having the smaller ID is at the upper edge of the solid line section RP, which is located at the lower side of the one solid line section RP. In the example of FIG. 5A, since $\Delta X_{(i-1,i-2)}$ is >0, it is determined that the white line predicted position WLPP of ID=(i−1) is at the lower edge of the solid line section RP1, and the white line predicted position WLPP of ID=(i−2) is at the upper edge of the solid line section RP2.

Contrary to FIG. 5A, when the IDs are assigned from the upper side to the lower side, i.e., in an increasing manner from the positive side to the negative side of the $X_v$-axis, the value of $\Delta X_{(p,q)}$ becomes negative. Therefore, if $\Delta X_{(p,q)} < 0$, the IDs are assigned from the positive side to the negative side of the $X_v$-axis. Then, it is possible to determine that the white line predicted position WLPP having the smaller ID is at the lower edge of one solid line section RP, and the white line predicted position WLPP having the larger ID is at the upper edge of the solid line section RP, which is located at the lower side of the one solid line section RP.

Then, the white line predicted range WLPR is set in accordance with whether the predicted range reference point Pref is at the upper edge or the lower edge of the solid line section. For example, when the predicted range reference point Pref is at the lower edge of the solid line section RP as shown in FIG. 5B, the range having a predetermined distance $\Delta X$ from the predicted range reference point Rref in the positive direction of the $X_v$-axis and a predetermined distance $\Delta Y$ from the predicted range reference point Rref in the positive and negative directions of the $Y_v$-axis is determined as the white line predicted range WLPR. On the contrary, when the predicted range reference point Pref is at the upper edge of the solid line section RP as shown in FIG. 5C, the range having a predetermined distance $\Delta X$ from the predicted range reference point Rref in the negative direction of the $X_v$-axis and a predetermined distance $\Delta Y$ from the predicted range reference point Rref in the positive and negative directions of the $Y_v$-axis is determined as the white line predicted range WLPR.

In this way, by using the white line map positions WLMP of the solid line sections RP stored in the high-density map, it is possible to correctly determine the white line predicted positions WLPR to cover the solid line section RP, even if the white line is the broken-line type.

In the above example, the white line map information in the high-density map only include the white line map positions of the solid line sections RP of the broken-line type white line. Instead, the white line map information may include the white line map positions WLMP of both the solid line sections RP and the space sections SP, and each of the white line map positions WLMP may include a flag indicating which one of the solid line section RP and the space section SP the white line map position WLMP corresponds to. In that case, the above processing may be executed by referring to the flag and acquiring only the white line map positions WLMP corresponding to the solid line sections RP.

(2) In Case that the White Line is Curved

Figure 6A:
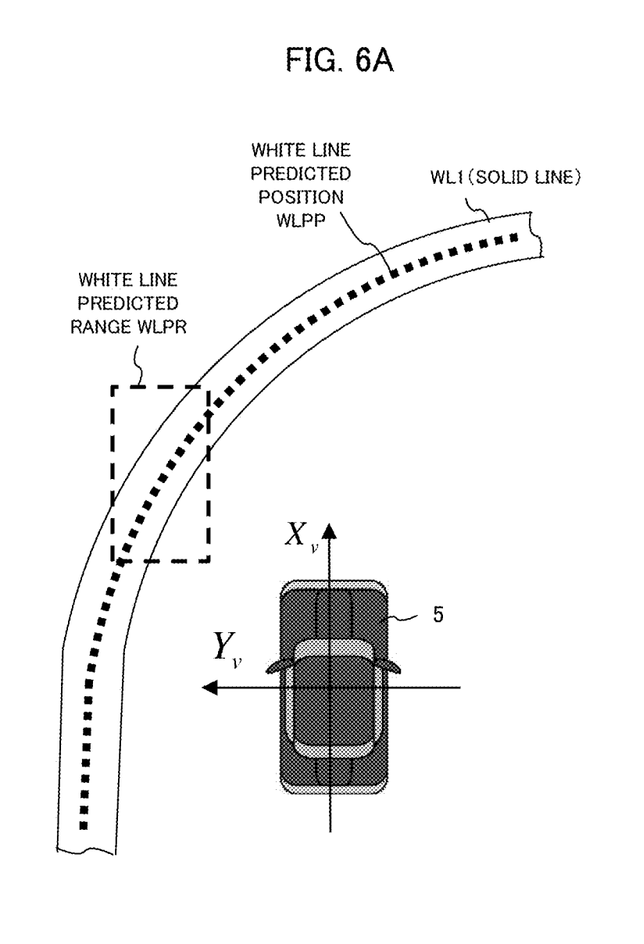
FIGS. 6A and 6B are diagrams explaining a determination method of a white line predicted range of a curved white line.

The white line predicted ranges WLPR shown in FIG. 1 are set on the assumption that the white lines are straight. However, when the white line is curved, there is a possibility that sufficient white line scan data cannot be extracted. For example, when the white line WL is curved as shown in FIG. 6A, the area of the white line WL covered by the white line predicted range WLPR becomes small, and the number of the acquired white line scan data is reduced.

Figure 6B:
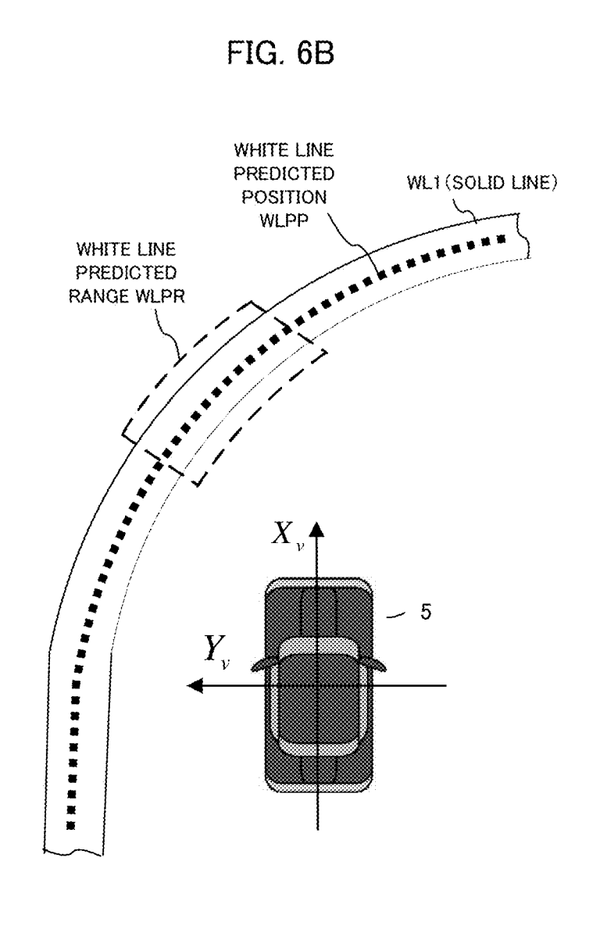

As a countermeasure, when curvature of the curved part of the white line is included in the white line map information stored in the high-density map, the shape of the white line predicted range WLPR may be appropriately determined using the curvature. Specifically, as shown in FIG. 6B, the shape of the white line predicted range WLPR is curved along the white line based on the curvature of the white line included in the white line map information. By this, a larger area of the white line WL is included in the white line predicted range WLPR, and more white line scan data WLSD can be extracted. Therefore, the accuracy of extracting the white line becomes high, and the accuracy of estimating the own vehicle position can be improved.

As a specific method, for example, an approximate expression corresponding to the curve of the white line is calculated based on the curvature of the white line stored in the high-density map, and the coordinates defining the outer circumference of the white line predicted range WLPR can be determined based on the approximate expression. Also, by performing such an arithmetic operation in accordance with the curvature in advance, the correction amount of the white line predicted range WLPR in the $X_v$-axis direction and the $Y_v$-axis direction with respect to the curvature of the curve may be calculated and stored in a look-up table (LUT). Then, when the vehicle 5 travels, the white line predicted range WLPR may be corrected based on the curvature acquired from the white line map information by referring to the LUT.

[Device Configuration]

Figure 7:
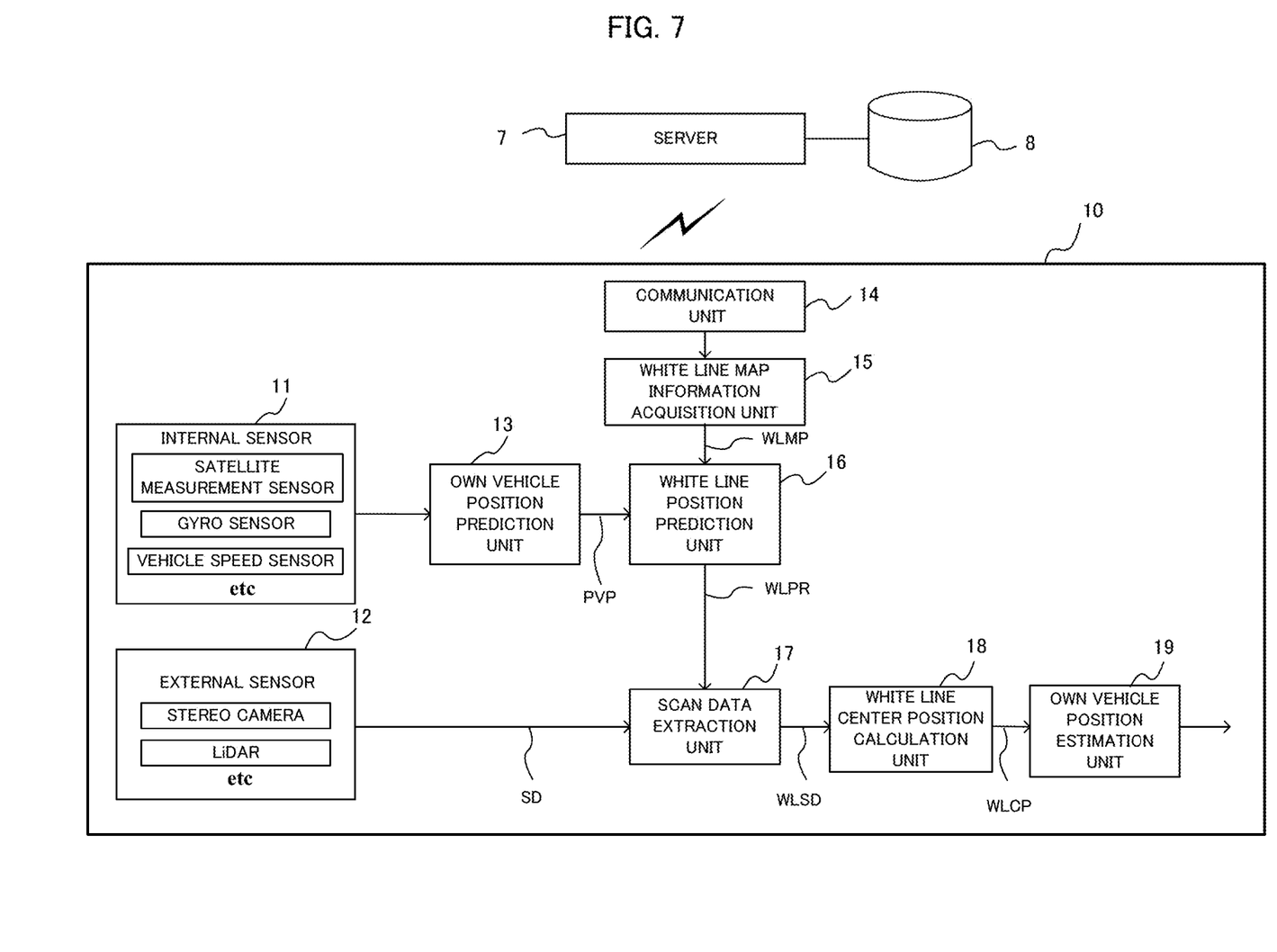
FIG. 7 is a block diagram illustrating a configuration of a measurement device.

FIG. 7 illustrates a schematic configuration of an own vehicle position estimation device to which a measurement device according to the present invention is applied. The own vehicle position estimation device 10 is loaded on a vehicle, and communicable with a server 7 such as a cloud server by wireless communication. The server 7 is connected to a database 8, and the database 8 stores high-density map. The high-density map stored in the database 8 includes landmark map information for each landmark. As to the white lines, the database 8 stores white line map information including the white line map positions WLMP indicating the coordinates of the point sequence forming the white lines. The own vehicle position estimation device 10 communicates with the server 7, and downloads the white line map information related to the white lines around the position of the vehicle.

Here, in this embodiment, as to the broken-line type white line, the white line map information includes only the white line map positions corresponding to the solid line sections RP or includes flags indicating whether the white line map position corresponds to the solid line section RP or the space section SP, as described above. Further, the white line map information includes the curvature at the curved part of the white line.

The own vehicle position estimation device 10 includes internal sensors 11, external sensors 12, an own vehicle position prediction unit 13, a communication unit 14, a white line map information acquisition unit 15, a white line position prediction unit 16, a scan data extraction unit 17, a white line center position calculation unit 18 and an own vehicle position estimation unit 19. The own vehicle position prediction unit 13, the white line map information acquisition unit 15, the white line position prediction unit 16, the scan data extraction unit 17, the white line center position calculation unit 18 and the own vehicle position estimation unit 19 are realized by a computer such as a CPU which executes a program prepared in advance.

The internal sensors 11 measure the own vehicle position of the vehicle as a GNSS (Global Navigation Satellite System)/IMU (Inertia Measurement Unit) composite navigation system, and include a satellite measurement sensor (GPS), a gyro sensor and a vehicle speed sensor. The own vehicle position prediction unit 13 predicts the own vehicle position by the GNSS/IMU composite navigation system based on the outputs of the internal sensors 11, and supplies the predicted own vehicle position PVP to the white line position prediction unit 16.

The external sensors 12 are the sensors for detecting objects around the vehicle, and include a stereo camera and a LiDAR. The external sensors 12 supply the scan data SD acquired by the measurement to the scan data extraction unit 17.

The communication unit 14 is used for wireless communication with the server 7. The white line map information acquisition unit 15 receives the white line map information associated with the white lines existing around the vehicle from the server 7 via the communication unit 14, and supplies the white line map positions WLMP included in the white line map information to the white line position prediction unit 16.

The white line position prediction unit 16 calculates the white line prediction positions WLPP by the aforementioned equation (1) based on the white line map positions WlMP and the predicted own vehicle position PVP acquired from the own vehicle position prediction unit 13. Also, the white line position prediction unit 16 determines the white line prediction ranges WLPR by the aforementioned equations (2) and (3) based on the white line prediction positions WLPP. As to the broken-line type white line, the white line position prediction unit 16 determines the white line predicted ranges WLPR based on the white line map positions WLMP of the solid line sections RP as described above. Also, as to the curved part of the white line, the white line position prediction unit 16 determines the white line predicted ranges WLPR based on the curvature of the curved part as described above. Then, the white line position prediction unit 16 supplies the determined white line prediction ranges WLPR to the scan data extraction unit 17.

The scan data extraction unit 17 extracts the white line scan data WLSD based on the white line prediction ranges WLPR supplied from the white line position prediction unit 16 and the scan data SD acquired from the external sensors 12. Specifically, from the scan data SD, the scan data extraction unit 17 extracts the scan data which are included in the white line prediction ranges WLPR, which are on the road, and whose reflection intensity is larger than a predetermined value, as the white line scan data WLSD, and supplies them to the white line center position calculation unit 18.

The white line center position calculation unit 18 calculates the white line center positions WLCP from the white line scan data WLSD by the equation (4), as described with reference to FIGS. 3A and 3B. Then, the white line center position calculation unit 18 supplies the calculated white line center positions WLCP to the own vehicle position estimation unit 19.

The own vehicle position estimation unit 19 estimates the own vehicle position and the own vehicle azimuth angle based on the white line map positions WlMP in the high-density map and the white line center positions WLCP which are the measurement data of the white lines by the external sensor 12. Japanese patent application laid-open under No 2017-72422 discloses an example of a method for estimating an own vehicle position by matching the landmark position information in the high-density map and the measured position information of the landmark by external sensors.

In the above configuration, the external sensor 12 is an example of a sensor unit according to the present invention, the scan data extraction unit 17 is an example of an acquisition unit and an extraction unit of the present invention, the white line prediction unit 16 is an example of a determination unit of the present invention, and the own vehicle position estimation unit 19 is an example of a processing unit of the present invention.

[Own Vehicle Position Estimation Processing]

Figure 8:
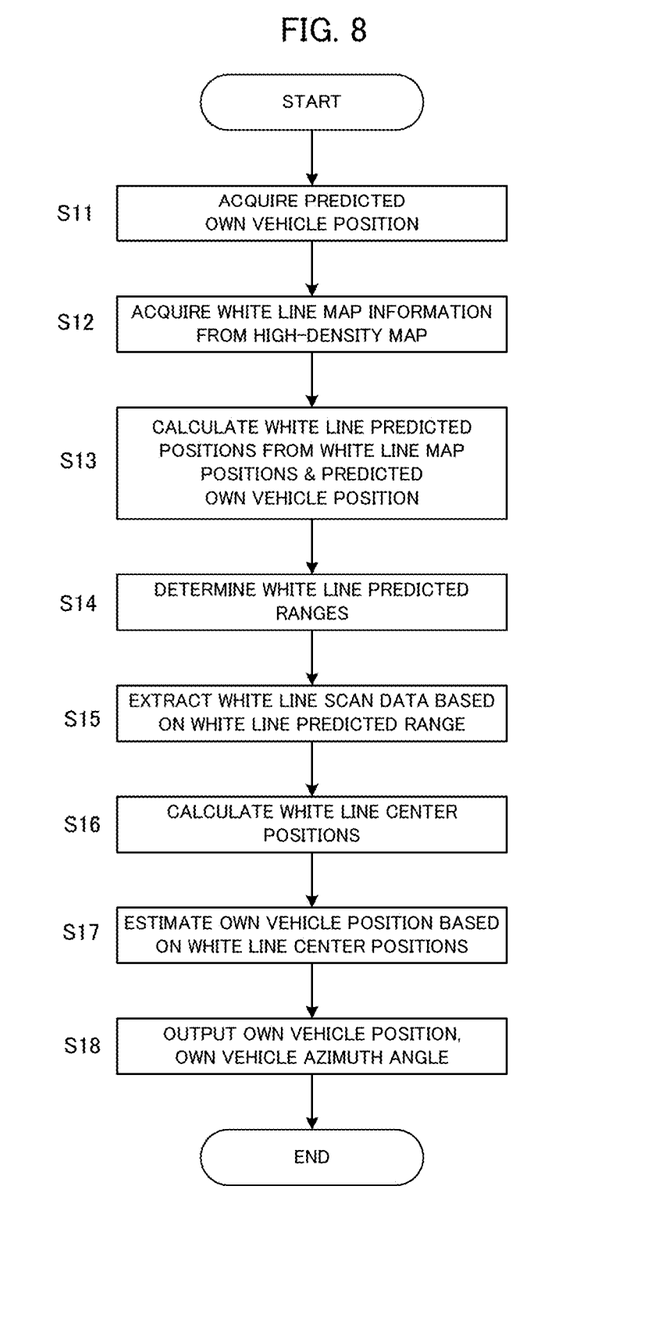
FIG. 8 is a flowchart of an own vehicle position estimation processing using white lines.

Next, the own vehicle position estimation processing by the own vehicle position estimation device 10 will be described. FIG. 8 is a flowchart of the own vehicle position estimation processing. This processing is realized by a computer such as a CPU which executes a program prepared in advance to function as the components shown in FIG. 7.

First, the own vehicle position prediction unit 13 acquires the predicted own vehicle position PVP based on the outputs from the internal sensors 11 (step S11). Next, the white line map information acquisition unit 15 connects to the server 7 via the communication unit 14, and acquires the white line map information from the high-density map stored in the database 8 (step S12). Here, the white line map information acquisition unit 15 acquires the white line map positions WLMP corresponding to the solid line sections RP for the broken-line type white line as described above. Also, the white line map information acquisition unit 15 acquires the curvature of the curved part of the white line. It is noted that step S11 and S12 may be exchanged.

Next, the white line position prediction unit 16 calculates the white line prediction positions WLPP based on the white line map positions WLMP included in the white line position information acquired in step S12 and the predicted own vehicle position PVP acquired in step S11 (step S13). Also, the white line position prediction unit 16 determines the white line predicted ranges WLPR based on the white line predicted positions WLPP. At that time, as to the broken-line type white line, the white line position prediction unit 16 determines the white line predicted ranges WLPR using the white line map positions WLMP of the solid line sections RP as described above. Also, as to the curved part of the white line, the white line position prediction unit 16 determines the white line predicted ranges WLPR based on its curvature. Then, the white line position prediction unit 16 supplies the white line predicted ranges WLPR to the scan data extraction unit 17 (step S14).

Next, from the scan data SD acquired from the LiDAR serving as the external sensor 12, the scan data extraction unit 17 extracts the scan data which are included in the white line prediction ranges WLPR, which are on the road, and whose reflection intensity is larger than the predetermined value, as the white line scan data WLSD, and supplies them to the white line center position calculation unit 18 (step S15).

Next, the white line center position calculation unit 18 calculates the white line center positions WLCP based on the white line prediction ranges WLPR and the white line scan data WLSD, and supplies them to the own vehicle position estimation unit 19 (step S16). Then, the own vehicle position estimation unit 19 executes own vehicle position estimation using the white line center positions WLCP (step S17), and outputs the own vehicle position and the own vehicle azimuth angle (step S18). Then, the own vehicle position estimation processing ends.

[Modified Example]

While the above embodiment uses the white lines which are the lane boundaries indicating the lanes, the application of the present invention is not limited to this example, and linear road signs such as pedestrian crossings and stop lines may be used. Also, instead of white lines, yellow lines may be used. The lane dividing lines such as white and yellow lines and the road signs mentioned above are examples of road surface lines according to the present invention.

BRIEF DESCRIPTION OF REFERENCE NUMBERS

5 Vehicle
7 Server
8 Database
10 Own vehicle position estimation device
11 Internal sensor
12 External sensor
13 Own vehicle position prediction unit
14 Communication unit
15 White line map information acquisition unit
16 White line position prediction unit
17 Scan data extraction unit
18 White line center position calculation unit
19 Own vehicle position estimation unit

The invention claimed is:

1. A measurement device installed in a movable body, the measurement device comprising:
a processor coupled to a memory storing instructions, the processor being configured to:
acquire output data from an external sensor for detecting road surface lines around the movable body;
determine a white line predicted range in which the data from the external sensor is to be extracted, based on an own position of the movable body measured by an internal sensor and positional information of broken-line type road surface lines;
extract, from the output data, data detected in the white line predicted range;
detect the road surface lines based on the extracted data and estimate a position of the measurement device based on the positions of the road surface lines; and
execute an autonomous driving of the movable body based on the position of the movable body,
wherein the processor sets a first reference point ahead of the own position of the movable body, determines a white line predicted position nearest to the first reference point as a second reference point, and determines a rectangular box having predetermined lengths from the second reference point in a traveling direction of the movable body and a direction perpendicular to the traveling direction as the white line predicted range.

2. The measurement device according to claim 1, wherein the processor determines the white line predicted range based on the own position of the movable body and the positional information of solid line sections of the broken-line type road surface lines.

3. The measurement device according to claim 2, wherein the processor detects edges of the solid line sections, and determines the white line predicted range based on the edges.

4. The measurement device according to claim 3, wherein the processor detects the edges based on a difference of the positional information of plural points forming the solid line sections.

5. The measurement device according to claim 1,
wherein the processor sets the white line predicted ranges at four positions including a right-front position, a right-rear position, a left-front position and a left-rear position with respect to a position of the movable body.

6. A measurement device installed in a movable body, the measurement device comprising:
a processor coupled to a memory storing instructions, the processor being configured to:
acquire output data from an external sensor for detecting road surface lines around the movable body;
determine a white line predicted range in which the data from the external sensor is to be extracted, based on an own position of the movable body measured by an internal sensor, curvature of the road surface lines and positional information of road surface lines;
extract, from the output data, data detected in the white line predicted range;
detect the road surface lines based on the extracted data and estimate a position of the measurement device based on the positions of the road surface lines; and
execute an autonomous driving of the movable body based on the position of the movable body,
wherein the processor sets a first reference point ahead of the own position of the movable body, determines a white line predicted position nearest to the first reference point as a second reference point, and determines a rectangular box having predetermined lengths from the second reference point in a traveling direction of the movable body and a direction perpendicular to the traveling direction as the white line predicted range.

7. A measurement method executed by a measurement device installed in a movable body, the measurement method comprising:
- an acquisition process configured to acquire output data from an external sensor for detecting road surface lines around the movable body;
- a determination process configured to determine a white line predicted range in which the data from the external sensor is to be extracted, based on an own position of the movable body measured by an internal sensor and positional information of broken-line type road surface lines;
- an extraction process configured to extract, from the output data, data detected in the white line predicted range;
- a processing process configured to detect the road surface lines based on the extracted data and estimate a position of the measurement device based on the positions of the road surface lines;
- execute an autonomous driving of the movable body based on the position of the movable body;
- setting a first reference point ahead of the own position of the movable body;
- determining a white line predicted position nearest to the first reference point as a second reference point; and
- determining a rectangular box having predetermined lengths from the second reference point in a traveling direction of the movable body and a direction perpendicular to the traveling direction as the white line predicted range.

8. A measurement method executed by a measurement device installed in a movable body, the measurement method comprising:
- an acquisition process configured to acquire output data from an external sensor for detecting road surface lines around the movable body;
- a determination process configured to determine a white line predicted range in which the data from the external sensor is to be extracted, based on an own position of the movable body measured by an internal sensor, curvature of the road surface line and positional information of road surface lines;
- an extraction process configured to extract, from the output data, data detected in the white line predicted range;
- a processing process configured to detect the road surface lines based on the extracted data and estimate a position of the measurement device based on the positions of the road surface lines;
- execute an autonomous driving of the movable body based on the position of the movable body;
- setting a first reference point ahead of the own position of the movable body;
- determining a white line predicted position nearest to the first reference point as a second reference point; and
- determining a rectangular box having predetermined lengths from the second reference point in a traveling direction of the movable body and a direction perpendicular to the traveling direction as the white line predicted range.

9. A non-transitory computer-readable medium storing a program executed by a measurement device including a processor of a computer coupled to a memory storing instructions, the measurement device being installed in a movable body, the program causing the processor of the computer to:
- acquire output data from an external sensor for detecting road surface lines around the movable body;
- determine a white line predicted range in which the data from the external sensor is to be extracted, based on an own position measured by an internal sensor and positional information of broken-line type road surface lines;
- extract, from the output data, data detected in the white line predicted range;
- detect the road surface lines based on the extracted data and estimate a position of the measurement device based on the positions of the road surface lines; and
- execute an autonomous driving of the movable body based on the position of the movable body,
- wherein the processor sets a first reference point ahead of the own position of the movable body, determines a white line predicted position nearest to the first reference point as a second reference point, and determines a rectangular box having predetermined lengths from the second reference point in a traveling direction of the movable body and a direction perpendicular to the traveling direction as the white line predicted range.

10. A non-transitory computer-readable medium storing a program executed by a measurement device including a processor of a computer coupled to a memory storing instructions, the measurement device being installed in a movable body, the program causing the processor of the computer to:
- acquire output data from an external sensor for detecting road surface lines around the movable body;
- determine a white line predicted range in which the data from the external sensor is to be extracted, based on an own position of the movable body measured by an internal sensor, curvature of the road surface line and positional information of road surface lines;
- extract, from the output data, data detected in the white line predicted range;
- detect the road surface lines based on the extracted data and estimate a position of the measurement device based on the positions of the road surface lines; and
- execute an autonomous driving of the movable body based on the position of the movable body,
- wherein the processor sets a first reference point ahead of the own position of the movable body, determines a white line predicted position nearest to the first reference point as a second reference point, and determines a rectangular box having predetermined lengths from the second reference point in a traveling direction of the movable body and a direction perpendicular to the traveling direction as the white line predicted range.

* * * * *